(12) United States Patent
Zhou (10) Patent No.: US 7,765,416 B2
(45) Date of Patent: Jul. 27, 2010

(54) CONTROL DEVICE FOR A POWER SUPPLY WITH ZERO POWER CONSUMPTION IN STANDBY MODE

(76) Inventor: Xianpu Zhou, Room 313, C Building, Software Garden, Enterprise Center, Thulium High Technology, Baotou, Neimenggu 014010 (CN)

( * ) Notice: Subject to any disclaimer, the term of this patent is extended or adjusted under 35 U.S.C. 154(b) by 708 days.

(21) Appl. No.: 11/631,699

(22) PCT Filed: Jul. 1, 2005

(86) PCT No.: PCT/CN2005/000963

§ 371 (c)(1),
(2), (4) Date: Jan. 5, 2007

(87) PCT Pub. No.: WO2006/002600

PCT Pub. Date: Jan. 12, 2006

(65) Prior Publication Data

US 2008/0195874 A1 Aug. 14, 2008

(30) Foreign Application Priority Data

Jul. 5, 2004 (CN) .................... 2004 1 0062286

(51) Int. Cl.
*G06F 1/00* (2006.01)
(52) U.S. Cl. .................... 713/320; 713/300
(58) Field of Classification Search ............ 713/300, 713/323; 348/730
See application file for complete search history.

(56) References Cited

U.S. PATENT DOCUMENTS

| | | | | |
|---|---|---|---|---|
| 5,414,475 A * | 5/1995 | Trzyna et al. | ............... | 348/730 |
| 6,107,698 A * | 8/2000 | Ochiai et al. | .................. | 307/43 |
| 6,292,233 B1 * | 9/2001 | Erba et al. | ................. | 348/730 |
| 6,295,217 B1 * | 9/2001 | Yang et al. | .................... | 363/49 |
| 6,414,864 B1 * | 7/2002 | Hoshi | .......................... | 363/69 |
| 6,496,390 B2 * | 12/2002 | Yang | ....................... | 363/21.07 |
| 6,553,499 B1 * | 4/2003 | Weigold et al. | ............. | 713/300 |
| 6,947,296 B2 * | 9/2005 | Hirosawa | ..................... | 363/20 |
| 7,444,530 B2 * | 10/2008 | Deppe et al. | ................ | 713/323 |
| 7,538,826 B2 * | 5/2009 | Englert | ........................ | 348/730 |

FOREIGN PATENT DOCUMENTS

| | | | |
|---|---|---|---|
| CN | 1246758 A | | 8/2000 |
| JP | 6-133551 | | 5/1994 |
| JP | 2001-86569 | * | 3/2001 |

* cited by examiner

*Primary Examiner*—Chun Cao
(74) *Attorney, Agent, or Firm*—Thomas, Kayden, Horstemeyer & Risley, LLP (57) ABSTRACT

The present invention discloses a kind of control device for a power supply with zero power consumption in standby mode, which includes a driver, an intermediate relay, a power relay, a signal induction circuit, a working power supply monitoring circuit for controlled equipment, a power switching circuit, a single-chip microcomputer and a battery. When a standby command is received by said signal induction circuit, said single-chip microcomputer causes said intermediate relay to cut off the power supply of the controlled equipment and the power switching circuit by said driver. When the controlled equipment is in standby mode, all parts of the control device of the invention are in the off state but the signal induction circuit is powered by the battery, so as to gain safety with low power consumption.

13 Claims, 3 Drawing Sheets

CONTROL DEVICE FOR A POWER SUPPLY WITH ZERO POWER CONSUMPTION IN STANDBY MODE

CROSS REFERENCE TO RELATED APPLICATION

This application claims priority to Chinese Application No. 200410062286.2 filed Jul. 5, 2004 and International PCT Application No. PCT/CN2005/000963 filed Jul.1, 2005.

FIELD OF THE INVENTION

The present invention relates to the electrical household appliance field, particularly to a control device for a power supply with zero power consumption in standby mode applicable to electrical household appliances.

BACKGROUND OF THE INVENTION

Presently, the traditional scheme of power control device in electrical household appliance field is:

1) Employ a power supply unit (mainly switching power supply unit) as the standby power supply unit, power off most of the functional circuits, and still use the existing control and signal detection circuits (e.g., single-chip microcomputer and infrared receiving circuit) to control the standby power supply;

2) Employ an assistant AC power supply unit (linear power supply unit or switching power supply unit) as the standby power supply unit and control the standby power supply in conjunction with the existing control and detection circuits (e.g., single-chip microcomputer and infrared receiving circuit) or in conjunction with a separate standby power supply unit.

In the traditional scheme 1, the power consumption in standby mode comprises power consumption of the power supply unit and power consumption of the functional circuit of the controlled electrical appliance.

In one aspect, the inefficiency of the power supply unit and the functional circuit of the controlled electrical appliance under light load condition is a common problem in all power devices. Though the working efficiency of modern switching power supply units under rated load can be as high as 90% or above, the efficiency of those switching power supply units is still very low under light load, resulting in high standby power consumption. Though the standby power consumption of switching power supply units is reduced increasingly by utilizing low power consuming devices, materials, and leading control structures, such an improving process delivers poor results and the standby power consumption is reduced slowly; in addition, it strongly depends on the manufacturing level of fundamental electronic components and the latest design theories and methods for switching power supply units.

In addition, as the standby power consumption of a power supply unit is reduced gradually, the problem of standby power consumption of the functional circuit of the controlled electrical appliance becomes more and more prominent; as a result, reduction of standby power consumption also involves performing overall energy-saving design for all functional circuits of the controlled electrical appliance. Since the functional circuits of the controlled electrical appliance are usually complex, such renovation will cause increased workload, high technical risk, and longer time cycle of renovation. The energy saving design for specific electrical appliance is not applicable to other electrical appliances, and requires high financial investment and talent support. As increasingly strict standby power consumption standards are enacted, electrical household appliance companies will face great renovation pressure.

In traditional scheme 2, the ideal approach is to utilize the standby power consumption index of the controlled electrical appliance as the design index for rated working set-point of the assistant power supply unit (mainly switching power supply unit). In that way, the assistant power supply unit will be in a preferable load state when it is used to support standby function; since the efficiency is higher, the standby power consumption of the power supply unit may be very low. If lower standby power consumption is expected, the functional circuits of the controlled electrical appliance have to be renovated, or a separate standby power control circuit has to be utilized; as a result, the overall standby power consumption of the controlled electrical appliance can be reduced to a very low value. Apparently, such a scheme requires high direct cost and high renovation cost.

As the level of social civilization becomes higher and higher, more and more users (as high as 88%, as indicated by the sampling data from China Certification Center for Energy Conservation Products) favor standby mode. A fatal problem in AC power standby mode is that both the demanding operating environment of electrical household appliances and the weak structure of switching power supply units will result in severe potential safety hazard. That problem can't be overcome with traditional AC power standby schemes.

In view of above problems, many researchers have put forward solutions that employ a separate standby power control device, with the main idea as follows:

1) Before entering into the standby mode, physically cut off AC power supply to the controlled electrical appliance to shut it down completely, and then employ a separate standby power control device to control the standby process;

2) The standby power control device employs a non-AC power supply unit;

3) The power loss of the power supply unit itself can be neglected; the power consumption of the standby power control device in standby mode is the power capacity of the non-AC power supply unit.

That approach can achieve the following three effects:

1) The overall standby power consumption of the complete electrical appliance (measured externally) is equal to zero;

2) It implements intrinsically safe standby since the AC power supply is cut off completely;

3) Since the separate standby power control device is not complex, the power consumption can be very low. Therefore, the microscopic standby power consumption (power capacity of the non-AC power supply unit) of the controlled electrical appliance can be very low.

Viewed from the view point of AC power standby, the power consumption of the separate standby power control device in standby mode is now very low; as a result, the possibility and practicality of further reducing standby power consumption and the corresponding control structure are seldom investigated. More discussions focus on the power supply mode of non-AC power supply unit; the existing schemes include: storage battery, solar (photoelectric) battery, disposable battery, charged capacitor, and a variety of combined standby power supply schemes. Common problems in those schemes are: high complexity, increased cost, and a variety of problems in the special application environment of electrical household appliances.

For example, few people watch TV programs in darkness; therefore, the photoelectric battery scheme is almost feasible as long as the photoelectric battery can provide enough power to drive the relay. However, under the conditions of different light radiation angles and different radiation intensities, the user may feel apparent changes of control sensitivity of the remote controller, and thereby doubt the quality of the product.

The most possible storage battery scheme has three fatal defects:

1) The battery and the additional circuit may cause apparently increased cost;

2) The controlled electrical appliance must be started up before the end of the discharge cycle of the battery; otherwise the controlled electrical appliance can't be started up due to depletion of battery power. Any other remedial measure will increase operation complexity.

3) The most severe problem is: the service life of a storage battery doesn't match that of the controlled electrical appliance (for example, TV sets usually have a safe service life of 8-10 years).

Disposable Li—$SOCl_2$ batteries have a service life of 10-15 years; theoretically, the service life of the battery can reach 10-15 years as long as the consumed power within the battery life is less than the power capacity of the battery. However, in order to minimize the battery cost, the overall standby current of the standby power control device must be reduced to a tiny level, which is apparently a very tough task.

The patent document "Power Saving Infrared Sensing System" (Chinese Patent No.: 98117670.4) disclosed a scheme that is closest to the ideal solution. The scheme is: in standby mode, the power control device itself is in sleep mode; an extremely low power-consumption front-stage induction circuit (referred to as an infrared on-duty circuit in this document) that is powered separately is used to monitor the lead code from the remote controller; once the lead code occurs, the power control device is woken up; then, the working infrared receiving circuit is activated to attain the expected control purpose.

That scheme tried to utilize the sleep mode of a single-chip microcomputer to reduce the standby power consumption of the control device; in addition, the inventor also recognized the problem of high standby power consumption of existing infrared receiving circuits (working infrared receiving circuit). The scheme attained the purpose of reducing standby power consumption by means of an "On Duty—Wake UP" mode.

However, the drawback in structure is that in sleep mode, the single-chip microcomputer and the peripheral circuit still produce power consumption, two infrared receiving circuits are required and the scheme for processing the power circuit (AC power supply switch) is not provided. The low power dissipation of the circuit makes no sense if the control of the AC power supply switch can't be settled effectively. The overall power consumption problem is that the standby power consumption not only comes from the control circuit and infrared receiving circuits, more important, it also comes from abnormal power loss in other parts of the system. For example, if there is no appropriate control structure, the battery has to supply power to the relay in the long term in case there is no AC power supply unit or the AC power supply unit fails during the process the controlled electrical appliance operates, resulting in severe battery power consumption. The structure of "front-stage induction circuit" itself is unable to provide very low standby power consumption as expected; therefore, it is difficult to employ a low capacity battery to supply power in the long term.

Viewed from functionality aspect the remote controller must support the cyclic code format of lead code 38 khz data codes. As a result, any general-purpose remote controller is not suitable; the bandwidth of on-duty circuit is too low, and thereby can only adapt to a few code formats. In addition, employing a disposable battery to supply power in the long term in Sleep—Wake-UP mode will cause the single-chip microcomputer to be unable to reset in long term due to power shortage. As a result, once the software system becomes disordered, the entire device can't be recovered to normal operation. Therefore, the scheme can't solve the problems substantially.

SUMMARY OF THE INVENTION

The object of the present invention is to provide a control device for a power supply with zero power consumption in standby mode that has extremely low power consumption and can ensure safe standby.

To attain the above object, the technical scheme of the standby power supply control device with zero power consumption provided in the present invention comprises a driver, an intermediate relay, a power relay, a signal induction circuit, a working power supply monitoring circuit for the controlled equipment, a power switching circuit, a single-chip microcomputer, and a battery; wherein:

said single-chip microcomputer controls said intermediate relay via said driver; the normally open contact of said intermediate relay is connected in tandem to the coil of said power relay and then cross-connected to two AC power lines; the output of said signal induction circuit is connected to a control end of said power switching circuit and said single-chip microcomputer; said battery is connected to the power end of said signal induction circuit and an input end of said power switching circuit; the other input end of said power switching circuit is connected to the working power supply unit for said controlled equipment, the output of said power switching circuit is used as power supply to said single-chip microcomputer and intermediate relay, and the control end of said power switching circuit is connected to said single-chip microcomputer;

the input end of said working power supply monitoring circuit for controlled equipment is connected to the working power supply unit for said controlled equipment, and the output end of said working power supply monitoring circuit is connected to said single-chip microcomputer; the working power supply monitoring circuit is designed to monitor whether the working power supply to said controlled equipment is established normally or not during the startup process of said controlled equipment and monitor whether the working power supply to the controlled equipment is normal or not during the normal working process of the controlled equipment;

when said single-chip microcomputer receives the output signal indicating "the working power supply to the controlled equipment is normal" from said working power supply monitoring circuit for controlled equipment, it controls said power switching circuit to open the power supply channel for the working power supply to said controlled equipment;

when said signal induction circuit receives the standby command, said single-chip microcomputer instructs said intermediate relay to cut off power supply to the controlled equipment via said driver and also disconnect said power switching circuit;

said power switching circuit is designed to choose the working power supply unit for said controlled equipment or said battery to supply power to said single-chip microcomputer and said intermediate relay in accordance with the command from said single-chip microcomputer or to choose to close the power supply channel.

Furthermore, said power switching circuit in the control device for a power supply with zero power consumption in standby mode provided in the present invention comprises a voltage reduction and filtering circuit and the second power control switch; wherein:

the input end of said voltage reduction and filtering circuit is connected to the working power supply unit for said controlled equipment, and the output end of said voltage reduction and filtering circuit is used together with the output of said second power control switch as the output of said power switching circuit;

the input end of said second power control switch is connected to said battery; the first control end of said second power control switch is connected to the output end of said signal induction circuit; the second control end of said second power control switch is connected to said single-chip microcomputer.

Furthermore, said power switching circuit also comprises the first power control switch connected in tandem between said voltage reduction and filtering circuit and the output end of said power switching circuit; wherein:

the output from said first power control switch is used as the output of said power switching circuit, the third control end of said first power control switch is connected to said single-chip microcomputer;

said first power control switch receives signals from said third control end to control open/close of the working power supply channel for said controlled equipment.

Furthermore, the control device for a power supply with zero power consumption in standby mode provided in the present invention further comprises an AC power detection circuit connected in tandem between said intermediate relay and said power relay, with the output of said AC power detection circuit connected to said single-chip microcomputer, designed to detect the power supply to said power relay.

Furthermore, the control device for a power supply with zero power consumption in standby mode provided in the present invention further comprises a power transformation circuit, with two input ends connected to the working power supply unit for said controlled equipment and said battery and the output end connected to said signal induction circuit, designed to utilize the working power supply unit for said controlled equipment to supply power to said signal induction circuit if the working power supply unit for said controlled equipment exists, otherwise to utilize said battery to supply power to said signal induction circuit.

Furthermore, the control device for a power supply with zero power consumption in standby mode provided in the present invention further comprises a working state detection circuit for said controlled equipment, with the input end connected to the working state indication circuit of said controlled equipment and the output end connected to said single-chip microcomputer, designed to detect the working state of said controlled equipment.

Furthermore, the control device for a power supply with zero power consumption in standby mode provided in the present invention further comprises a level matching circuit, with the input end connected to the output end of said signal induction circuit and the output end connected to the signal receiving end of said controlled equipment, designed to match the input level to the level of said controlled equipment and input the signals to the controlled equipment.

Furthermore, the control device for a power supply with zero power consumption in standby mode provided in the present invention further comprises the second driver, with the output end of it connected to one end of the coil of said intermediate relay, the two control ends of it connected to the two control ends of said single-chip microcomputer, two input ends of it connected to the working power supply unit for said controlled equipment and said battery respectively, and another input end of it connected to the other end of the coil of said intermediate relay.

Furthermore, the signal induction circuit in the control device for a power supply with zero power consumption in standby mode provided in the present invention is an infrared signal receiving circuit.

Furthermore, the signal induction circuit in the control device for a power supply with zero power consumption in standby mode provided in the present invention is a temperature receiving circuit.

Furthermore, said infrared signal receiving circuit in the control device for a power supply with zero power consumption in standby mode provided in the present invention comprises the first infrared signal receiving circuit and the second infrared signal receiving circuit; wherein:

one end of the first infrared signal receiving circuit is connected to said battery, and the signal output end of the first infrared signal receiving circuit is connected to said power switching circuit; said first infrared signal receiving circuit is designed to monitor infrared signal changes in the environment in standby mode;

the power end of the second infrared signal receiving circuit is connected to the output end of said power switching circuit, and the signal output end of the second infrared signal receiving circuit is connected to said single-chip microcomputer, to transmit the received infrared code signal to said single-chip microcomputer or also to said controlled equipment.

Compared to the prior art, the standby power supply control device with zero power consumption provided in the present invention has the following benefits:

1. In the control device for a power supply with zero power consumption in standby mode provided in the present invention, when said signal induction circuit receives the standby command, said single-chip microcomputer stops excitation to said intermediate relay via said driver so as to cut off AC power supply to the controlled equipment and shut off the power supply to said single-chip microcomputer and said intermediate relay via said power switching circuit. Therefore, when said controlled equipment is in standby mode, in the components of the standby power supply control device with zero power consumption provided in the present invention, only said signal induction circuit is powered by said battery (i.e., has power consumption), while the power supply to all other components are cut off (i.e., no power consumption). As a result, the power consumption of the standby power supply control device with zero power consumption provided in the present invention is extremely low.

Furthermore, the invention avoids the drawback of utilizing a single-chip microcomputer to shut down the functional circuits in conventional designs and thereby reduces the pins of single-chip microcomputer and simplifies the circuits; whenever the single-chip microcomputer starts up, it can accomplish power-on reset automatically, and thereby avoid possible faults during long term operation; in addition, the present invention is also applicable to single-chip microcomputers without wake-up feature and has wider applicability.

2. Since the control device for a power supply with zero power consumption in standby mode provided in the present invention physically cuts off AC power supply to said controlled equipment when said controlled equipment is in standby mode, it implements intrinsically safe standby.

3. Since the control device for a power supply with zero power consumption in standby mode provided in the present invention shuts down said single-chip microcomputer completely when the controlled equipment is in standby mode, it eliminates the contribution of standby current and pin leakage current of said single-chip microcomputer to the overall standby current. As a result, both the total volume and the degree of discreteness of standby current are reduced, and thereby the standby current of the control device for a power supply with zero power consumption in standby mode provided in the present invention solely depends on the standby current of said signal induction circuit.

4. Another technical scheme of the control device for a power supply with zero power consumption in standby mode provided in the present invention further employs an AC power detection circuit connected in tandem between the contact of said intermediate relay and the coil of said power relay, with the output of said AC power detection circuit connected to said single-chip microcomputer to detect the power supply to said power relay. In the foresaid technical scheme of the control device for a power supply with zero power consumption in standby mode provided in the present invention, when said signal induction circuit receives a signal, said power switching circuit is activated by the output pulse from said signal induction circuit, so that said battery supplies power to said single-chip microcomputer. After said single-chip microcomputer resets and starts up, it sends a "power supply hold" signal to said power switching circuit to keep the power supply channel of said battery. In addition, said single-chip microcomputer will judge said signal; if said signal is a startup signal for said controlled equipment, said single-chip microcomputer connects the power supply to the coil of said intermediate relay via said driver. When the normally open contact of said intermediate relay closes, the AC power supply to the coil of said power relay is connected; when the normally open contact of said power relay closes, the AC power supply to said controlled equipment is connected, and after a certain time, the working power supply to said controlled equipment will be established under normal conditions.

Said AC power detection circuit can be used to monitor whether the AC current driving the coil of said power relay will be produced immediately after the normally open contact of said intermediate relay closes, and said single-chip microcomputer will hereby judge whether it is required to proceed with the AC power connection process. If said AC power detection circuit detects the existence of AC power supply, said single-chip microcomputer will believe said intermediate relay has closed and will keep said intermediate relay in a low power-consumption closed state via said driver; if said AC power detection circuit doesn't timely detect AC current, it will cancel excitation to said intermediate relay immediately. Said AC power detection circuit can also timely detect whether there is AC power outage during normal operation of the controlled equipment, and thereby timely cancel excitation to said intermediate relay. With that control scheme, sudden severe power loss of said battery can be reduced significantly in the startup process of the controlled equipment and under some abnormal conditions.

This is because during the period from the time the AC power supply to the controlled equipment is switched on to the time the working power supply monitoring circuit for said controlled equipment detects that the working power supply to said controlled equipment is established, said single-chip microcomputer, especially said intermediate relay, is powered by said battery, and thereby the power loss of said battery is heavy. As a result, the condition of the working power supply to said controlled equipment can be detected by means of the working power supply monitoring circuit for said controlled equipment, and said single-chip microcomputer can timely be notified to control said power switching circuit to switch power supply to said single-chip microcomputer to the working power supply unit for said controlled equipment. Furthermore, if said single-chip microcomputer doesn't detect working power supply to said controlled equipment within a specified time, it will cancel excitation to said intermediate relay immediately, to avoid continued nonsense battery power consumption. Therefore, that approach further reduces power loss of said battery; that is to say, the power consumption of the standby power supply control device with zero power consumption provided in the present invention is further reduced.

5. Another technical scheme of the control device for a power supply with zero power consumption in standby mode provided in the present invention further employs a power transformation circuit, with the two input ends connected to the working power supply unit for the controlled equipment and said battery, respectively, and the output end connected to said signal induction circuit, designed to utilize the working power supply unit for said controlled equipment to supply power to said signal induction circuit if the working power supply unit for said controlled equipment exists, and to otherwise utilize said battery to supply power to said signal induction circuit. In the foresaid technical scheme, no matter whether said controlled equipment is in standby mode or is on, said signal induction circuit is powered by said battery. In contrast, said power transformation circuit in this technical scheme utilizes the working power supply unit for the controlled equipment to supply power to said signal induction circuit when said controlled equipment is on, i.e., the channel between said signal induction circuit and said battery is cut off, and thereby the power loss of said battery is further reduced; that is to say, the power consumption of the standby power supply control device with zero power consumption provided in the present invention is further reduced.

6. Another technical scheme of the control device for a power supply with zero power consumption in standby mode provided in the present invention further employs a working state detection circuit for said controlled equipment, with the input end connected to the working state indication circuit of said controlled equipment and the output end connected to said single-chip microcomputer, designed to detect the working state of said controlled equipment. In the case of shutdown of the controlled equipment without signal, such as scheduled shutdown, (i.e., said signal induction circuit doesn't receive the standby signal while said controlled equipment enters into standby mode), said working state detection circuit for the controlled equipment will notify said single-chip microcomputer if it detects said controlled equipment has entered into standby mode, and said single-chip microcomputer will also cut off the power supply to itself and said intermediate relay, so that all components in the standby power supply control device with zero power consumption provided in the present invention are powered off, except for said signal induction circuit.

7. Another technical scheme of the control device for a power supply with zero power consumption in standby mode provided in the present invention further employs a level matching circuit, with the input end of it connected to the output end of said signal induction circuit and the output end of it connected to said controlled equipment. Said level matching circuit is powered by the working power supply unit for said controlled equipment, and is designed to match the input signal level to the signal level of said controlled equipment and input the signals to said controlled equipment. For controlled equipment without signal receiving circuit, this scheme can be used to input signals to the controlled equipment so as to control said equipment.

DETAILED DESCRIPTION OF THE EMBODIMENTS

Figure 1:
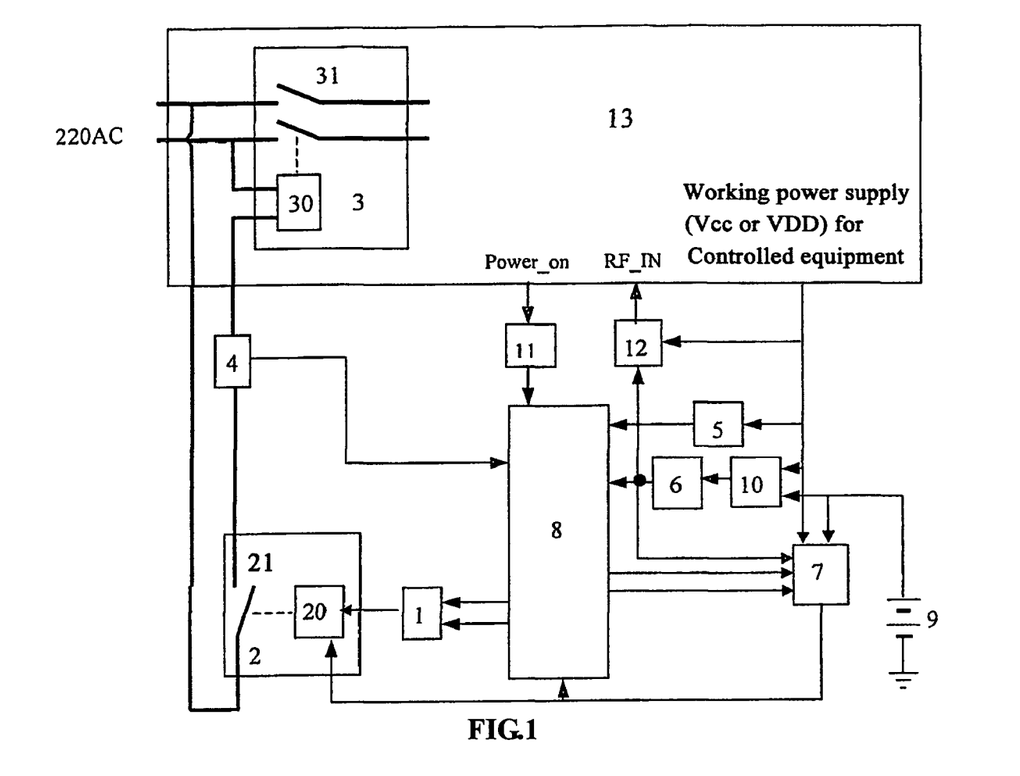
FIG. 1 is a structural block diagram of the control device for a power supply with zero power consumption in standby mode provided in the present invention.

As shown in FIG. 1, the standby power supply control device with zero power consumption provided in the present invention comprises driver 1, intermediate relay 2, power relay 3, working power supply monitoring circuit 5 for said controlled equipment, signal induction circuit 6, power switching circuit 7, single-chip microcomputer 8, and battery 9; wherein:

said single-chip microcomputer 8 controls said intermediate relay 2 via said driver 1; the normally-open contact 21 of said intermediate relay 2 are connected in tandem to the coil 30 of said power relay 3 and then cross-connected to two AC power lines; the output of said signal induction circuit 6 is connected to a control end of said power switching circuit 7 and said single-chip microcomputer 8; said battery 9 is grounded at one end and connected to the input end of said signal induction circuit 6 and an input end of said power switching circuit 7; the other input end of said power switching circuit 7 is connected to the working power supply unit for said controlled equipment, the output end of said power switching circuit 7 connected to the power end of said single-chip microcomputer 8 and the power end of said intermediate relay 2; and the remaining two control ends of said power switching circuit 7 are connected to said single-chip microcomputer 8;

the input end of the working power supply monitoring circuit 5 for said controlled equipment is connected to the working power supply unit for said controlled equipment, and the output end of said monitoring circuit 5 is connected to said single-chip microcomputer 8, so as to monitor the working power supply to said controlled equipment 13;

When said single-chip microcomputer 8 receives the output signal from said working power supply monitoring circuit 5 for the controlled equipment, it controls said power switching circuit 7 to open the power supply channel for working power supply to said controlled equipment;

when said signal induction circuit 6 receives the standby command, said single-chip microcomputer 8 cuts off power supply to the coil 20 of said intermediate relay 2 via said driver 1, so as to cut off power supply to said controlled equipment 13; in addition, said signal induction circuit 6 disconnects said power switching circuit 7;

said power switching circuit 7 is designed to choose the working power supply unit of said controlled equipment or said battery to supply power to said single-chip microcomputer 8 and said intermediate relay 2 in accordance with the command from said single-chip microcomputer 8, or to choose to close the two power supply channels completely in standby mode.

During the process, the controlled equipment 13 is in standby mode, the signal induction circuit 6 in the standby power supply control device with zero power consumption provided in the present invention is powered by said battery 9, while other parts are powered off. When said signal induction circuit 6 receives a signal, said power switching circuit 7 is activated by the output pulse from said signal induction circuit 6, so that said battery 9 supplies power to said single-chip microcomputer 8; after said single-chip microcomputer 8 resets and starts up, it sends a "power supply hold" signal to said power switching circuit 7 to keep the power supply channel of said battery. In addition, said single-chip microcomputer 8 will judge said signal received from said signal induction circuit 6 (e.g., infrared code); if said signal doesn't indicate to start up the controlled equipment 13, said single-chip microcomputer 8 will cancel the "power supply hold" signal for said power switching circuit 7, and thereby the standby power supply control device with zero power consumption provided in the present invention will recover to the state in which said signal induction circuit 6 works while other parts (e.g., said single-chip microcomputer 8) are in off state. If the signal indicates to start up the controlled equipment 13, said single-chip microcomputer will connect the power supply to the coil 20 of said intermediate relay 2 via said driver 1, and thereby said power relay 3 closes to power on the controlled equipment 13; after the controlled equipment 13 is powered on for a certain time, the working power supply for said controlled equipment is established. When said working power supply monitoring circuit 5 for said controlled equipment detects working power supply to said controlled equipment, it will send a signal to said single-chip microcomputer 8; when said single-chip microcomputer 8 receives that signal, it will control said power switching circuit 7 to cut off the power supply channel of said battery 9 and connect the working power supply channel to the controlled equipment.

Therefore, when said controlled equipment 13 is in working mode, all components except for said signal induction circuit 6 in the standby power supply control device with zero power consumption in the present invention are powered by the working power supply unit for said controlled equipment, so as to reduce power loss of said battery 9 and prolong the service life of said battery 9.

When said controlled equipment 13 is in working mode, if said signal induction circuit 6 receives a standby signal, said signal induction circuit 6 will transmit said signal to said single-chip microcomputer 8; said single-chip microcomputer 8 will cut off said intermediate relay 2 and thereby cut off said power relay 3 by said driver 1, i.e., the AC power supply to said controlled equipment 13 is cut off completely, the working power supply for said controlled equipment disappears, and said power switching circuit 7 has no output, and, as the result, the power supply to said single-chip microcomputer 8 and said intermediate relay 2 is cut off. The power supply to said controlled equipment 13 is cut off completely; that is to say, when said controlled equipment 13 is in standby mode, in the control device for a power supply with zero power consumption in standby mode in the present invention, only said signal induction circuit 6 is powered by said battery 9, while all other parts are in the off state.

Figure 3:
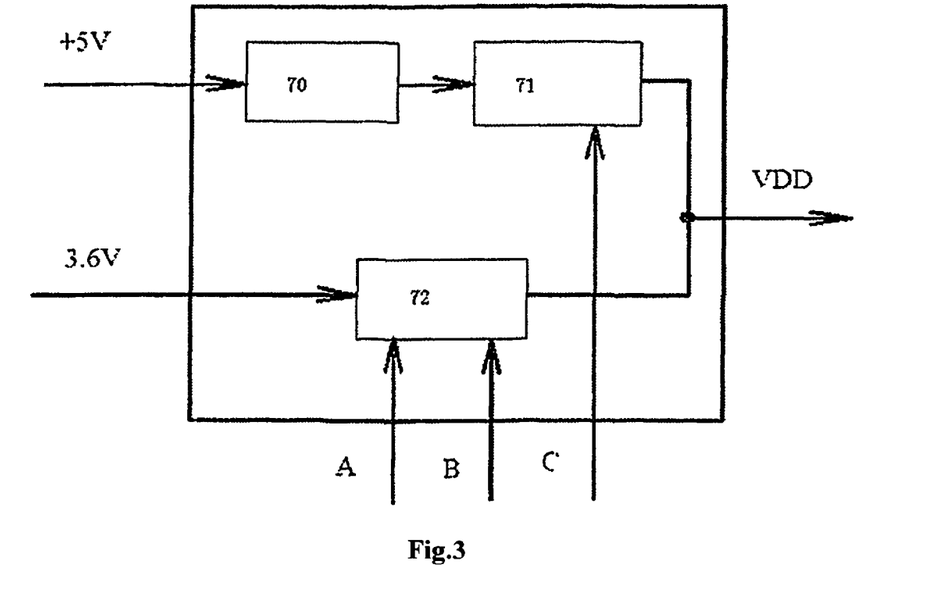
FIG. 3 is a structural block diagram of a power switching circuit in the control device for a power supply with zero power consumption in standby mode provided in the present invention.

As shown in FIG. 3, said power switching circuit 7 comprises a voltage reduction and filtering circuit 70 and the second power control switch 72; wherein:

the input end of said voltage reduction and filtering circuit 70 is connected to the working power supply unit for said controlled equipment, and the output end of said voltage reduction and filtering circuit 70 is used together with the output of said second power control switch 72 as the output of said power switching circuit 7;

the input end of said second power control switch 72 is connected to said battery 9; the first control end A of said second power control switch 72 is connected to the output end of said signal induction circuit 6; the second control end B of said second power control switch 72 is connected to said single-chip microcomputer 8.

After the working power supply for said controlled equipment passes through said voltage reduction and filtering circuit 70, it can block power supply from said battery 9 automatically and thereby serve as the power supply to the controlled equipment as long as the current of said working power supply is slightly higher than the current through said second power control switch 72.

As shown in FIG. 3, said power switching circuit 7 further comprises the first power control switch 71 connected in tandem between said voltage reduction and filtering circuit 70 and the output end of said power switching circuit 7; wherein:

the output from said first power control switch 71 is used as the output of said power switching circuit 7, the third control end C of said first power control switch 71 is connected to said single-chip microcomputer 8;

said first power control switch 71 receives signals from said third control end C to control open/close of the working power supply channel for said controlled equipment.

The input end of said voltage reduction and filtering circuit 70 is connected to the working power supply unit for said controlled equipment, and the output end of said voltage reduction and filtering circuit 70 is connected to the input end of said first power control switch 71. The input end of said second power control switch 72 is connected to said battery 9. The output of said first power control switch 71 and the output of said second power control switch 72 are used as the output of said power switching circuit 7. The third control end C of said first power control switch 71 is connected to said single-chip microcomputer 8. The first control end A of said second power control switch 72 is connected to the output end of said signal induction circuit 6, and the second control end B of said second power control switch 72 is connected to said single-chip microcomputer 8.

When said signal induction circuit 6 delivers an output pulse, said output pulse causes said second power control switch 72 to open the power supply channel of said battery 9 via the first control end A. Said single-chip microcomputer 8 sends a control signal via said second control end B and third control end C to control said first power control switch 71 to open the working power supply channel for said controlled equipment, or to control said second power control switch 72 to keep power supply from said battery 9, or to close the two power supply channels completely. Note: when the power supply channel of said battery 9 is opened, the power supply channel of working power supply unit for said controlled equipment is closed, and vice versa.

When said controlled equipment 13 is in standby mode, said power switching circuit 7 is cut off completely; said signal induction circuit 6 will trigger said power switching circuit 7 to activate said second power control switch 72 only when a control signal occurs. During the power-on process, said single-chip microcomputer 8 is powered and starts up, and sends a power supply control signal to the second control end B; after the signal disappears, the second power control switch 72 is still in a closed state, and thereby maintains power supply to said single-chip microcomputer 8.

If said single-chip microcomputer 8 doesn't receive any signal that instructs to start up said controlled equipment 13, it will cancel the control signal to the second control end B of said second power control switch 72; as the result, the power supply to said single-chip microcomputer 8 is cut off completely.

When said single-chip microcomputer 8 receives a signal that instructs to start up said controlled equipment 13, and said single-chip microcomputer 8 finds the working power supply to said controlled equipment is normal (indicating said controlled equipment 13 is started up successfully), said single-chip microcomputer 8 will connect the first power control switch 71 via the third control end C and then disconnect the second power control switch 72 via the second control end B. That is to say, said single-chip microcomputer 8 will close the power supply channel of said battery 9 and open the power supply channel of working power supply unit for said controlled equipment. In that case, said battery 9 doesn't deliver current.

In case of AC power outage during that process, said single-chip microcomputer 8 will disconnect the first power control switch 71 and cancel excitation to said intermediate relay 2; or, as the working power supply to said controlled equipment disappears, the excitation to said intermediate relay 2 will be lost automatically. In that way, even if the AC power supply recovers, said single-chip microcomputer 8 will not restart automatically.

Furthermore, as shown in FIG. 1, the control device for a power supply with zero power consumption in standby mode in the present invention further comprises an AC power supply detection circuit 4 connected in tandem between the normally opened contact 21 of said intermediate relay 2 and the coil 30 of said power relay 3, with the output connected to said single-chip microcomputer 8, designed to detect power supply to said power relay 3.

When said single-chip microcomputer 8 causes the normally opened contact of said intermediate relay 2 to close via said driver 1, since said AC power supply detection circuit 4 is connected in tandem between the contact of said intermediate relay 2 and the coil 30 of said power relay 3, said AC power supply detection circuit 4 will send an "AC power supply normal" signal to said single-chip microcomputer 8 if the AC power supply exists, indicating the coil 30 of said power relay 3 is excited normally and AC power supply has entered into said controlled equipment 13, and the switching power supply system in said controlled equipment will start up. When said single-chip microcomputer 8 receives that signal, it keeps said intermediate relay 2 in a low power consuming state via driver 1, proceeds with the startup procedures at the same time, and monitors the working power supply to said controlled equipment 13 via the working power supply monitoring circuit 5 for said controlled equipment. If said single-chip microcomputer 8 doesn't find a working power supply to said controlled equipment within the specified time, it indicates the controlled equipment 13 has failed, and thereby the single-chip microcomputer 8 will immediately cancel excitation to the intermediate relay 2 via driver 1, and simultaneously cancel excitation to the second power control switch 72 to cut off power supply to itself. If said single-chip microcomputer 8 finds a normal working power supply to said controlled equipment 13 within the specified time, it will deliver excitation to the first power control switch 71 via the third control end and cancel excitation to the second power control switch 72 at the same time, to switch the power supply to the working power supply unit for said controlled equipment 13. Now, said single-chip microcomputer 8 enters into normal monitoring state, and will not invoke the shutdown routine until the AC power supply is lost, DC power supply disappears, the controlled equipment 13 enters into standby mode automatically, or said single-chip microcomputer 8 receives a standby command.

Furthermore, as shown in FIG. 1, the control device for a power supply with zero power consumption in standby mode in the present invention further comprises a power transformation circuit 10, with two input ends connected to the working power supply unit for said controlled equipment and said battery 9 and the output end connected to said signal induction circuit 6, designed to utilize the working power supply unit for said controlled equipment to supply power to said signal induction circuit 6 if the working power supply unit for said controlled equipment exists, and otherwise to utilize said battery 9 to supply power to said signal induction circuit 6.

Said power transformation circuit 10 will automatically switch to the working power supply unit for said controlled equipment to supply power to said signal induction circuit 6, as long as the working power supply to said controlled equipment is normal; in that way, when said controlled equipment 13 is in working mode, said signal induction circuit 6 will be powered by the working power supply unit for said controlled equipment instead of said battery 9. Consequently, the power loss of said battery 9 is further reduced.

Furthermore, as shown in FIG. 1, the control device for a power supply with zero power consumption in standby mode provided in the present invention further comprises a working state detection circuit 11 for said controlled equipment, with the input end connected to the working state indication circuit of said controlled equipment and the output end connected to said single-chip microcomputer 8, designed to detect the working state of said controlled equipment 13.

In certain cases (e.g., said controlled equipment 13 shuts down without signal indication or shuts down as scheduled), though said signal induction circuit 6 doesn't receive any standby command, the controlled equipment 13 has actually entered into standby mode. In such a case, the working state detection circuit 11 for said controlled equipment can detect the current working state of said controlled equipment 13.I If the working state of said controlled equipment 13 is standby mode, said single-chip microcomputer 8 will cancel excitation to said intermediate relay 2 via said driver 1, and thereby shut down said controlled equipment 13 completely via said power relay 3.

Furthermore, as shown in FIG. 1, the control device for a power supply with zero power consumption in standby mode provided in the present invention further comprises a level matching circuit 12, with the input end connected to the output end of said signal induction circuit 6 and the output end connected to the signal input end (e.g., RF-IN) of said controlled equipment 13, designed to match the signal level of said signal induction circuit 6 to the signal level of said controlled equipment 13 and to input the signals to said controlled equipment 13. If the signal level of said signal induction circuit matches the signal level of said controlled equipment 13, said level matching circuit 12 can be omitted.

By feeding the signals received by said signal induction circuit 6 into said controlled equipment 13 through level matching, the signal induction circuit 6 for said controlled equipment 13 can be omitted, so as to further simplify said controlled equipment 13.

As shown in FIG.1, said intermediate relay 2 comprises coil 20 and normally opened contact 21; wherein, one end of said coil 20 is connected to the output end of said driver 1, the other end of said coil 20 is connected to the output end of said power switching circuit 7, one end of said normally opened contact 21 is connected directly to an AC power line, and the other end of said contact 21 is connected to said AC power supply detection circuit 4. Excited by said driver 1, the coil 20 will close said normally opened contact 21.

Said power relay 3 comprises coil 30 and normally opened contact 31; wherein, one end of said coil 31 is directly connected to another AC power line, and the other end of said coil 31 is connected in tandem to the normally opened contact 21 of said intermediate relay 2 via said AC power supply detection circuit 4.

As for said signal induction circuit 6 shown in FIG. 1, an infrared signal receiving circuit can be used, if said controlled equipment 13 is able to receive infrared signals (e.g., a TV set); or, a temperature sensing circuit can be used, if said controlled equipment 13 is unable to receive infrared signals but able to sense temperature (e.g., a refrigerator). Similarly, said signal induction circuit 6 can be a human body sensing circuit, etc.

Figure 4:
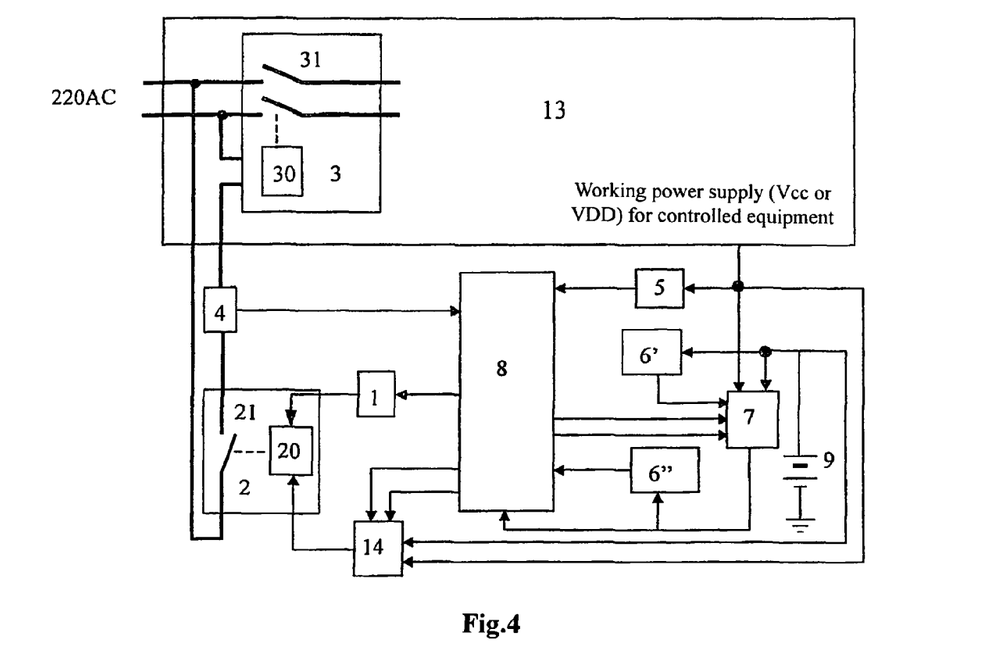
FIG. 4 is another structural block diagram of the control device for a power supply with zero power consumption in standby mode provided in the present invention.

As shown in FIG. 4, the control device for a power supply with zero power consumption in standby mode in the present invention further comprises the second driver 14. The control end of said driver 1 is connected to a control end of said single-chip microcomputer 8, and the output end of said driver 1 is connected to one end of coil 20 of said intermediate relay 2. The two control ends of said second driver 14 are connected to two control ends of said single-chip microcomputer 8, the two input ends of said second driver 14 are connected to the working power supply unit for said controlled equipment and said battery 9 respectively, and the output end of said second driver 14 is connected to the coil 20 of said intermediate relay 2.

Such a structure can avoid interference of the high drive current of said intermediate relay 2 to the power supply to said single-chip microcomputer 8, and is helpful for improving the reliability of the system.

The technical scheme of control device for a power supply with zero power consumption in standby mode provided in the present invention will be described in the embodiments below.

Figure 2:
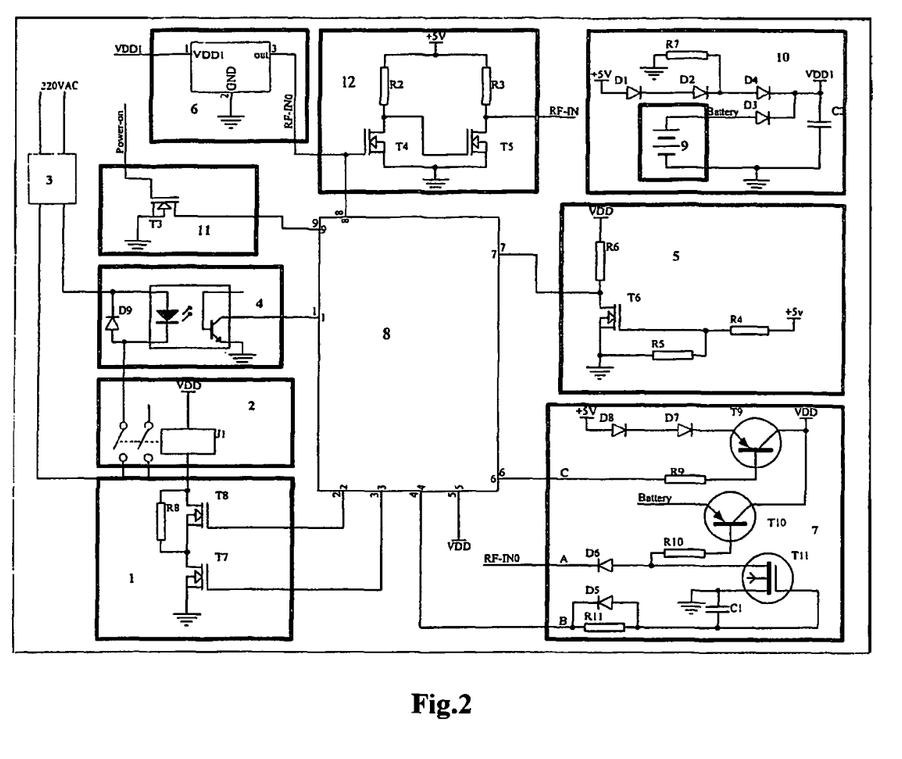
FIG. 2 is a schematic circuit diagram of an embodiment of the control device for a power supply with zero power consumption in standby mode provided in the present invention.

As shown in FIG. 2, the working power supply for said controlled equipment 13 is +5V; said signal induction circuit 6 is an infrared signal receiving circuit. Here, the working power supply to said infrared signal receiving 6 is denoted as VDD1, while the working power supply to the control device for a power supply with zero power consumption in standby mode in the present invention is denoted as VDD. The output signal RF-IN0 of said infrared signal receiving circuit 6 is connected to pin 8 of said single-chip microcomputer 8, the grid electrode of field effect transistor T4 in said level matching circuit 12, and the control end A of said power switching circuit 7. When there is no infrared signal, end A is at high level, without control effect to said power switching circuit 7, while pin 4 of said single-chip microcomputer 8 is at zero level and is connected to said field effect transistor T11 via diode D5, resistor R11, and capacitor C1, and, as a consequence, said field effect transistor T11 is powered off. Since the drain electrode of said field effect transistor T11 is connected to the base electrode of triode T10 via resistor R10, said triode T10 disconnects the power supply channel of said battery 9 because the base electrode is open. In addition, since the +5V working power supply to the controlled equipment disappears in standby mode, the power supply to the parts of the system (e.g., single-chip microcomputer 8) is cut off completely. In such a case, the disposable battery 9 supplies power to said infrared signal receiving circuit 6 via the power transformation circuit 10, diode D3, and filtering capacitor C2, so that the output of said infrared signal receiving circuit 6 keeps at high level when there is no infrared signal. In that way, in the entire system, only said infrared signal receiving circuit 6 keeps in working state, while all other circuits are in off state; therefore, only said infrared signal receiving circuit 6 produces static energy consumption in standby mode.

The control process is as follows:

Once said infrared signal receiving circuit 6 detects an external infrared signal, it will deliver a pulse string composed of high level and low level pulses. The level pulses pass through control end A of said power switching circuit 7, so that the base electrode of said triode T10 is connected to low level via diode D6 and resistor R10; as the result, said triode T10 gates on, and battery 9 produces VDD through said triode T10, and single-chip microcomputer 8 will power on. The single-chip microcomputer 8 delivers high level via pin 4 first, so that the field effect transistor T11 in said power switching circuit 7 will gate on because its grid electrode obtains high level via diode D5 and resistor R11. As a consequence, even if the low level infrared code disappears, said single-chip microcomputer 8 is still powered. Next, said single-chip microcomputer 8 receives infrared codes via pin 8.

If said single-chip microcomputer 8 doesn't receive the correct infrared code, it will deliver low level from pin 4 to the control end B of said power switching circuit 7 after a certain time delay, so that the power supply channel of said battery is closed, and said single-chip microcomputer 8 is powered off again.

If said single-chip microcomputer 8 receives the correct infrared code (instructing to power on the controlled equipment), it will deliver high level to the two control ends of said driver 1 via pin 2 and pin 3, so that the coil 20 of said intermediate relay 2 is powered, and thereby the normally opened contact 21 closes, to connect the AC power supply to the coil 30 of said power relay 3. Said single-chip microcomputer 8 will detect the condition of AC power supply via the AC power supply detection circuit 4. Said driver 1 employs field effect transistor T8, T7, and resistor R8, for the purpose of reducing power consumption of said intermediate relay 2 in the hold stage.

If said single-chip microcomputer 8 doesn't find AC power supply via pin 1 within the specified time, said single-chip microcomputer 8 will deem that the AC power supply doesn't exist, and will cancel excitation to the two field effect transistors T7 and T8 of said driver 1 first, in order to cut off power supply to the coil 20 of said intermediate relay 2. Then, said single-chip microcomputer 8 will deliver low level signal via pin 4, so that the power supply channel of said disposable battery 9 to said power switching circuit 7 is closed, and thereby said single-chip microcomputer 9 is powered off.

If said single-chip microcomputer 8 finds AC power supply in the specified time, it will keep excitation to said intermediate relay 2; as the result, the contact of said power relay 3 will close, to connect AC power supply to said controlled equipment 13.

Under normal conditions, the switching power supply unit for said controlled equipment 13 will start up normally within the specified time and deliver +5V working power supply, which indicates said controlled equipment 13 is in a ready state. Said single-chip microcomputer 8 delivers low level to the control end C of said power switching circuit 7 via pin 6 first, so that the +5V is connected to the working power supply VDD for single-chip microcomputer 8 via the triode T9.I In addition, said single-chip microcomputer 8 will deliver low level via pin 4 to close the power supply channel of said battery 9. In that way, said single-chip microcomputer 8 is powered solely by the +5V power supply for the controlled equipment.

On one hand, said single-chip microcomputer 8 monitors infrared codes via said infrared signal receiving circuit 6; if it finds shutdown code, it will invoke the shutdown routine immediately. First, it cancels excitation to said driver 1, so that said intermediate relay 2 and the coil 30 of said power relay 3 are powered off, and the contact 31 opens. Consequently, the AC power supply to said controlled equipment 13 is cut off; at the same time, the +5V power supply channel to the single-chip microcomputer 8 is closed via the power switching circuit 7, so that said single-chip microcomputer 8 is powered off.

On the other hand, the output codes from said infrared signal receiving circuit are transmitted to said controlled equipment 13 via the level matching circuit 12, composed of field effect transistors T4 and T5 and resistors R2 and R3, to instruct said controlled equipment 13 to accomplish corresponding functions.

In addition, when said controlled equipment 13 operates normally, said single-chip microcomputer 8 can also monitor the working state of said controlled equipment via said working state detection circuit 11, and thereby assist said controlled equipment in implementing relevant functions.

Said single-chip microcomputer 8 can also monitor said +5V power supply via the working power supply monitoring circuit 5 composed of resistors R4, R5 and R6 and field effect transistor T6, so as to take corresponding control actions timely.

As shown in FIG. 1 and FIG. 2, in this example, the power supply to TV set 13 is controlled. The two input ends of said power transformation circuit 10 are connected to the working power supply unit for said TV set and battery 9 respectively, and the output end of said circuit 10 is connected to the power end of said infrared signal receiving circuit 6. The two input ends of said power switching circuit 7 are connected to the working power supply unit for said TV set and battery 9, respectively, the three control ends of said circuit 7 are connected to single-chip microcomputer 8 and infrared signal receiving circuit 6, and the output end of said circuit 7 is connected to single-chip microcomputer 8 and a terminal of coil 20 of said intermediate relay 2. The two control ends of said driver 1 are connected to the control output end of main circuit of said single-chip microcomputer 8 and the other terminal of coil 20 of said intermediate relay 2 respectively. The normally opened contact 21 of intermediate relay 2, the AC power supply detection circuit 4, and the coil 30 of power relay 3 are connected in tandem and then connected to 220V AC power supply. The normally opened contact 31 of power relay 3 is connected to the main AC circuit of TV set 13. The output from said infrared signal receiving circuit 6 is directly connected to a port of said single-chip microcomputer 8, level matching circuit 12, and power switching circuit 7. The output from said level matching circuit 12 is connected to the infrared signal input end of said TV set 13; said level matching circuit 12 is powered by the working power supply for said TV set. The working state signal and working power supply of said TV set 13 are connected to said single-chip microcomputer 8 via the working state detection circuit 11 and working power supply monitoring circuit 5 for said TV set. The output from said AC power supply detection circuit 4 is directly connected to the input port of said single-chip microcomputer 8, so as to judge whether the AC power supply exists by means of changes of current through said coil 30.

After said TV set 13 is shut down (i.e., said TV set 13 enters into standby mode), in the control device for a power supply with zero power consumption in standby mode in the present invention, only said infrared signal receiving circuit 6 is powered by battery 9 through the power transformation circuit 10 and operates, while all other parts are in off state (zero power consumption). Whenever any button on the remote controller is pressed down, an output pulse from said infrared signal receiving circuit 6 will pass through said power switching circuit 7 and gate on the battery 9 shortly, so that the battery 9 supplies power to said single-chip microcomputer 8. After said single-chip microcomputer 8 starts up, it delivers a power supply hold signal to said power switching circuit 7 to keep open the power supply channel of said battery 9; at the same time, said single-chip microcomputer waits for infrared codes from the circuit 6. If said single-chip microcomputer 8 doesn't receive the predefined power supply control code, it will cancel the power supply hold signal for said power switching circuit 7 and return to the state in which said infrared signal receiving circuit 6 operates while said single-chip microcomputer 8 is off. If said single-chip microcomputer 8 receives the control code for TV set 13, it will excite said intermediate relay 2 via driver 1 to close the normally opened contact 21; in that case, said single-chip microcomputer monitors power supply to the coil 30 of said power relay 3 via said AC power supply detection circuit 4. If said single-chip microcomputer 8 has not found excitation current to the coil 30 of said power relay 3 after the preset excitation duration, it will cancel excitation to said intermediate 2 and cut off the power supply; if the coil 30 is excited normally and said single-chip microcomputer 8 finds working power supply to the TV set within the predefined duration via the working power supply monitoring circuit 5 for said TV set, said TV set 13 will enter into normal working mode. Said single-chip microcomputer 8 opens the power supply channel of the working power supply for said TV set via power switching circuit 7 and closes the power supply channel of said battery 9. When the power control button or any other functional button on the remote controller is pressed down later, the TV set 13 will enter into normal service state. If the power control (standby) button on the remote controller is pressed down when the TV set 13 operates normally, the single-chip microcomputer 8 will stop excitation to the coil 20, so that the normally opened contacts 21 and 31 open, and the AC power supply to the TV set 13 is cut off. The power supply channel of battery 9 is closed during the normal working process of said TV set; therefore, once AC power outage occurs, the excitation to said intermediate relay 2 will be stopped automatically. In conclusion, no matter whether in the AC power-on process or normal operation of the TV set, such a structure can ensure the excitation to said intermediate relay 2 will be canceled immediately in case of any abnormality in power supply, and thereby avoid long term excitation to the intermediate relay 2 solely by the battery 9.

Said power transformation circuit 10 can only accomplish automatic switchover between working power supply to the TV set and the battery 9 but is unable to cut off the TV set completely. The purpose of said circuit is to replace the battery 9 with the working power supply for the TV set to said infrared signal receiving circuit 6 once the AC power supply is established, so as to further reduce power loss of the battery 9.

The working state detection circuit 10 for the TV set can implement functional coordination between the standby power control device in the present invention with zero power consumption and the TV set 13 by means of detecting POWER-ON signal of the TV set 13 in some cases, for example, when the TV set is shut down without signal indication or shut down as scheduled, etc.

As shown in FIG. 4, the infrared signal receiving circuit 6 in the control device for a power supply with zero power consumption in standby mode provided in the present invention comprises the first infrared signal receiving circuit 6' and the second infrared signal receiving circuit 6". The output from the first infrared signal receiving circuit 6' is directly connected to a control end of said power switching circuit 7 to provide a simple on-duty circuit, which will trigger power switching circuit 7 to connect the working power supply to said single-chip microcomputer 8 when it receives an infrared signal.

The power end of the second infrared signal receiving circuit 6" is connected to the output end of said power switching circuit 7, and the output end of said circuit 6" is connected to said single-chip microcomputer 8. The second infrared signal receiving circuit 6" is designed to receive infrared code signals and transmit them to said single-chip microcomputer 8; the power supply to said second infrared signal receiving circuit 6" can also be cut off.

The intermediate relay 2 and power relay 3 in the control device for a power supply with zero power consumption in standby mode provided in the present invention can be replaced with semiconductor switches; therefore, the drive power can be reduced significantly, and the device will be more suitable for low cost application field.

INDUSTRIAL APPLICABILITY

With the technical scheme in which only the infrared signal receiving circuit 6 is powered while all other circuits are powered off in standby mode, the trouble of employing the single-chip microcomputer 8 to power off the functional circuits in conventional designs can be avoided, the pins of single-chip microcomputer 8 can be reduced, and the complexity of circuits can be reduced. Whenever the single-chip microcomputer 8 starts up, it can accomplish power-on reset automatically, avoiding possible faults during long-term operation of said single-chip microcomputer 8; in addition, that scheme is also applicable to any single-chip microcomputer 8 without Wake-Up feature and thereby has wider applicability.

By completely powering off the single-chip microcomputer 8 in standby mode, the effect of standby current and pin leakage current of said single-chip microcomputer 8 to the overall standby current can be eliminated. As a result, both the total quantity and the degree of discreteness of the standby current are reduced. The standby current of the control device for a power supply with zero power consumption in standby mode in the present invention solely depends on the standby current through said infrared signal receiving circuit 6; said infrared signal receiving circuit 6 can employ an extremely low power design and thereby requires extremely low power consumption in standby mode.

The power loss of battery 9 also includes the pulse current in the startup stage of said intermediate relay 2 and the working current of said single-chip microcomputer 8. On the premise of meeting the functional requirements, the single-chip microcomputer 8 can employ a lower working frequency as far as possible, with working current of about 2-300 mA. The average current through said intermediate relay 2 in the startup stage depends on the startup duration and startup frequency of said controlled equipment 13 as well as the power rating of coil 20 of said intermediate relay 2. With today's mechanical relay manufacturing level, the drive power for the coil of a micro relay for a 220V AC main circuit that is controlled with a contact can be as low as about 200 MW. Suppose the contact closing duration is 10 ms, and the TV set is powered on/off for 20 cycles per day, under the condition of typical starting time (<700 ms) of switching power supply units for electrical household appliances, the average current loss of battery resulted from said intermediate relay 2 is less than 3 μA; the total average current consumption of battery (including leakage current) can be less than 5μA.

Thanks to the accurate control function in the technical scheme, abnormal energy loss of battery 9 resulting from the control device for a power supply with zero power consumption in standby mode in the present invention can be eliminated completely. Therefore, even if a disposable battery with low capacity (e.g., 1000 mA) is used, a theoretical power supply life of 30 years or above can be achieved.

Thanks to the pulse current from the intermediate relay 2, passivation of the battery can be alleviated effectively, so that the actual service life of a Li—SOCl$_2$ battery with long shelf life (10-15 years) can be further prolonged to essentially match the service life of the electrical appliance (e.g., TV set); therefore, a disposable battery can be mounted as a permanent component in the appliance.

In standby mode, the control device for a power supply with zero power consumption in standby mode in the present invention, the controlled equipment 13, and the AC power supply unit are completely isolated from each other by relay contacts; as a result, the AC isolation capability is improved significantly. The AC isolation capability of the main circuit depends on the power relay 3. In an embodiment of the present invention, the power relay 3 can ensure the AC isolation rating of the main circuit is up to 2400 VAC and the voltage resistance rating of said intermediate relay 2 is up to 1500 VAC; therefore, the AC current in the entire system in standby mode is reduced to zero.

The sampling test report for color TV sets with the device provided in the present invention from BaoTou Technical Supervision shows: in standby mode, the typical value of battery supply current is 0.43 μA, and the AC current is zero; when the TV set operates normally, the battery supply current is zero.

The scheme is low in cost and doesn't change the traditional operating style; it is safer and implements intrinsically safe standby, eliminates standby power consumption, and sets the ultimate power consumption standard for electrical household appliances. It is helpful to improve product reliability and prevent product damage, and reduce maintenance costs of manufacturers and users. If the technique is widely used, it will be of great help to energy conservation and elimination of environmental problems, and will deliver great social benefits. Presently, power consumption in standby mode has become a focus in electrical household appliances as well as a technical barrier towards the future. China is a leading country in manufacturing of electrical household appliances; this technique will afford a unique competitive advantage around the world to the electrical household appliance manufacturing industry in China.

It is seen from the embodiments of the present invention, the present invention is very simple in circuit structure and completely employs low cost common components and elements; therefore, the present invention can be easily made into a dedicated integrated circuit chipset, which will be advantageous for generalization of the technique and application in electrical household products. In actual applications, the components involved mainly include a dedicated integrated circuit chipset that utilizes the technique provided in the present invention, a low-capacity Li—SOCl2 cell, an intermediate relay, a power relay, an infrared receiving diode, and an optical isolator; therefore, the device can be integrated into electrical household appliances at an extremely low cost, delivering great cost advantage. Since the cell is mounted permanently in the electrical household appliance, it will not increase the cost to end user. In addition, that technique can also be used to produce external power control devices in diverse forms with zero standby power consumption, providing an approach for application of a standby technique with zero power consumption for existing electrical household appliances. Merely in view of the annual yield of more than 70-million TV sets, a social possession of more than 400-million TV sets, and the strong wish for reducing standby power consumption in the society in China, the present invention has extremely strong market potential.

The invention claimed is:

1. A control device for a power supply with zero power consumption in standby mode, comprising:
    a driver, an intermediate relay, a power relay, a signal induction circuit, a working power supply monitoring circuit for controlled equipment, a power switching circuit, a single-chip microcomputer, and a battery; wherein:
    said single-chip microcomputer controls said intermediate relay via said driver; said intermediate relay has a normally opened contact connected in tandem to a coil of said power relay and then cross-connected to two AC power lines, an output end of said signal induction circuit is connected to a control end of said power switching circuit and said single-chip microcomputer, said battery is connected to a power end of said signal induction circuit and an input end of said power switching circuit, a second input end of said power switching circuit is connected to a working power supply unit for said controlled equipment, an output of said power switching circuit used as a power supply to said single-chip microcomputer and intermediate relay, and the control end of said power switching circuit connected to said single-chip microcomputer;
    an input end of said working power supply monitoring circuit for the controlled equipment is connected to the working power supply unit of said controlled equipment, an output end of said working power supply monitoring circuit is connected to said single-chip microcomputer; and the working power supply monitoring circuit is designed to monitor the working power supply for said controlled equipment;
    said single-chip microcomputer controls a working power supply channel to said controlled equipment via said power switching circuit, in accordance with the signal from the working power supply monitoring circuit for said controlled equipment;
    when said signal induction circuit receives a standby command, said single-chip microcomputer causes said intermediate relay and said power relay to cut off an AC power supply to said controlled equipment via said driver, and, at the same time, cut off the power supply to said single-chip microcomputer and intermediate relay via said power switching circuit; and
    said power switching circuit designed to choose the working power supply unit for said controlled equipment or said battery to supply power to said single-chip microcomputer and said intermediate relay or choose to close all power supply channels, in accordance with the command from said single-chip microcomputer.

2. The control device for a power supply with zero power consumption in standby mode as in claim 1, wherein, said power switching circuit comprises a voltage reduction and filtering circuit and a second power control switch;

wherein:
an input end of said voltage reduction and filtering circuit is connected to the working power supply unit for said controlled equipment, and an output end of said voltage reduction and filtering circuit is used together with an output of said second power control switch as the output of said power switching circuit; and an input end of said second power control switch is connected to said battery, one control end of said second power control switch is connected to the output end of said signal induction circuit, a second control end of said second power control switch is connected to said single-chip microcomputer.

3. The control device for a power supply with zero power consumption in standby mode as in claim 2, wherein said power switching circuit further comprises a first power control switch connected in tandem between the output end of said voltage reduction and filtering circuit and an output end of said power switching circuit; wherein:

the output from said first power control switch is used as the output of said power switching circuit, a third control end of said first power control switch is connected to single-chip microcomputer; and said first power control switch receives signals from said third control end to control open/close of the working power supply channel for said controlled equipment.

4. The control device for a power supply with zero power consumption in standby mode as in claim 3, wherein said device further comprises an AC power supply detection circuit connected in tandem between the normally opened contact of said intermediate relay and the coil of said power relay, with an output of said AC power detection circuit connected to said single-chip microcomputer, designed to detect power supply to said power relay.

5. The control device for a power supply with zero power consumption in standby mode as in claim 4, wherein said device further comprises a power transformation circuit with the input ends connected to the working power supply unit for said controlled equipment and said battery, respectively, and an output end connected to said signal induction circuit, designed to utilize the working power supply to said controlled equipment for power supply to said signal induction circuit when the working power supply to said controlled equipment exists, and to otherwise utilize said battery for power supply to said signal induction circuit.

6. The control device for a power supply with zero power consumption in standby mode as in claim 5, wherein said device further comprises a working state detection circuit for said controlled equipment, with an input end connected to the working state indication circuit of said controlled equipment and an output end connected to said single-chip microcomputer, designed to detect a working state of said controlled equipment.

7. The control device for a power supply with zero power consumption in standby mode as in claim 6, wherein said device further comprises a second driver, with an output end connected to one end of a coil of said intermediate relay, two control ends connected to two control ends of said single-chip microcomputer, and two input ends connected to the working power supply for the controlled equipment and said battery.

8. The control device for a power supply with zero power consumption in standby mode as in claim 7, wherein said device further comprises a level matching circuit, with an input end connected to the output end of said signal induction circuit and an output end connected to a signal receiving end of said controlled equipment, wherein the level matching circuit is designed to match the input level to the level of said controlled equipment and input the signals to the controlled equipment.

9. The control device for a power supply with zero power consumption in standby mode as in claim 1, wherein said signal induction circuit is an infrared signal receiving circuit.

10. The control device for a power supply with zero power consumption in standby mode as in claim 7, wherein said signal induction circuit is an infrared signal receiving circuit.

11. The control device for a power supply with zero power consumption in standby mode as in claim 1, wherein said signal induction circuit is a temperature sensing circuit.

12. The control device for a power supply with zero power consumption in standby mode as in claim 7, wherein said signal induction circuit is a temperature sensing circuit.

13. The control device for a power supply with zero power consumption in standby mode as in claim 9, wherein said infrared signal receiving circuit comprises a first infrared signal receiving circuit and a second infrared signal receiving circuit; wherein:

one end of the first infrared signal receiving circuit is connected to said battery, and a signal output end of the first infrared signal receiving circuit is connected to said power switching circuit; said first infrared signal receiving circuit is designed to monitor infrared signal changes in the environment in standby mode and to open said battery supply channel of said power switching circuit;

a power end of the second infrared signal receiving circuit is connected to the output end of said power switching circuit, and a signal output end of the second infrared signal receiving circuit is connected to said single-chip microcomputer; and a received infrared code signal is transmitted to said single-chip microcomputer or to both said single-chip microcomputer and said controlled equipment.

* * * * *